No. 873,158. PATENTED DEC. 10, 1907.
R. H. MOORE.
KNOTTER FOR HARVESTERS.
APPLICATION FILED JUNE 20, 1907.

WITNESSES:

Richard H. Moore,
INVENTOR.
By
ATTORNEYS

UNITED STATES PATENT OFFICE.

RICHARD H. MOORE, OF WAKITA, OKLAHOMA.

KNOTTER FOR HARVESTERS.

No. 873,158.　　　Specification of Letters Patent.　　　Patented Dec. 10, 1907.

Application filed June 20, 1907. Serial No. 379,960.

*To all whom it may concern:*

Be it known that I, RICHARD H. MOORE, a citizen of the United States, residing at Wakita, in the county of Grant, Oklahoma, have invented a new and useful Knotter for Harvesters, of which the following is a specification.

This invention has relation to twine knotters for harvesters and it consists in the novel construction and arrangement of its parts as hereinafter shown and described.

The object of the invention is to provide a knotter having the usual number of parts employed in such a device but the improvement resides in the relative arrangement of parts and coöperation of the same, whereby, all of the grain is bound and tied without the possibility of having some of the grain at times passed from the harvester without being bundled.

The peculiar arrangement of parts and configuration of the same is such that the ends of the twine are positively retained by the knotter until the loop in the twine has been passed around the same, thereby, assuring that the knot will be formed when the bundle is ejected from the harvester. The parts are also arranged so that the tying may take place close to the bundle and that the tension of the twine may be augmented around the bundle without affecting the tension of that part of the twine passing around the needle, thus, preventing the possibility of the grain slipping longitudinally from under the band of the twine after the bundle is bound thereby. The specific arrangement of the parts will be more definitely pointed out hereinafter.

Figure 1:
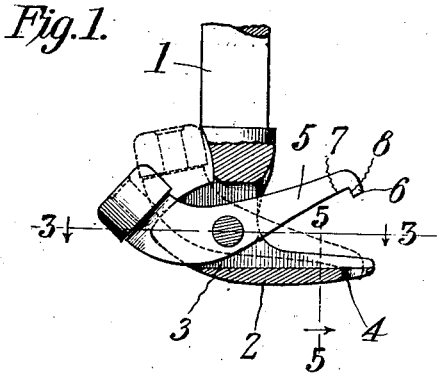
Figure 2:
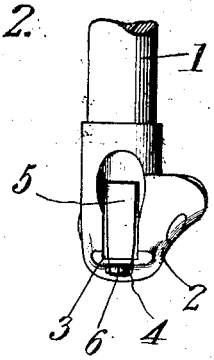
Figure 5:
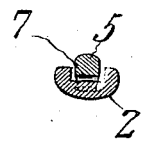
Figure 3:
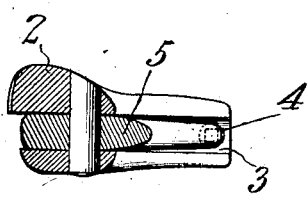
Figure 4:
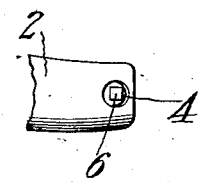

In the accompanying drawing:—Figure 1 is a side elevation of the knotter with parts in section. Fig. 2 is a front elevation of the same. Fig. 3 is a horizontal section cut on the line 3—3 of Fig. 1. Fig. 4 is a bottom plan view of a portion of the knotter, and Fig. 5 is a transverse sectional view of the knotter cut on the line 5—5 of Fig. 1.

The knotter comprises the spindle 1 to the end of which is fashioned a relatively fixed jaw 2. Said jaw 2 is slightly curved laterally and its upper and lower surfaces taper gradually toward each other. The jaw 2 is provided with the longitudinal channel 3 which is straight and of uniform transverse dimensions throughout. The said jaw is also provided with a circular perforation 4 located at the outer portion of the channel 3.

The jaw 5 is pivoted to the jaw 2 in the usual manner. The jaw 5 is adapted to enter the channel 3 of the jaw 2. The outer end of the jaw 5 terminates short of the outer end of the jaw 2. The jaw 5 is provided at its outer extremity with a hook portion 6 which is disposed at a right angle to the longitudinal axis of the said jaw 5. The hook portion 6 is preferably rectangular in cross section and is adapted to enter the circular perforation 4 of the jaw 2 when the jaws 2 and 5 are closed together. The jaw 5 gradually decreases in transverse dimensions both vertically and horizontally from its intermediate portion to the hook portion 6 and the under side 7 of the said jaw lies in a plane which is disposed at an acute angle to the plane of the inner side 8 of the hook 6. When the jaws are closed together the outer portion of the side 7 of the jaw 5 comes in contact with the bottom of the channel 3 while the inner portion of the side 7 remains out of contact with the bottom of the said channel.

From the foregoing description it will be seen that a knotter, having the usual number of parts, the portions of which are novelly disposed toward each other, is provided. The advantage gained by the specific configuration of the parts is that by reason of the fact that when the jaws 2 and 5 are closed the side 7 of the jaw 5 is inclined at an angle to the bottom of the channel 3 and the ends of the twine will be securely retained even though one end of the twine be thick and the other end be thin as the wedge-shaped disposition of the opposite surfaces of the jaws, will retain the twine. Also by reason of the relative disposition of the sides 7 and 8 it is impossible for the ends of the twine to slip from the knotter before the loop of the twine is passed over the same. Also by reason of the fact that the perforation 4 extends all the way through the jaw 2 and is circular while the hook 6 is non-circular it is impossible for the said perforations to become filled with tar, oil, grease, etc., from the twine to such an extent as to prevent the proper operation of the knotter as such objectionable matter will be forced through the perforation at each movement of the jaw 5 and inasmuch as the periphery of the hook 6 does not conform to that of the perforation 4 the said hook will not stick or wedge in the said perforation. By reason of the fact that the twine engaging end of the jaw 5 is shorter than the twine engaging end of the jaws 2 the ends of the twine may be retained between the said jaws while the loop passes from the same and is immediately drawn taut around the ends of the twine while they are still confined, thus tying the knot close to the bundle and augmenting the tension about the bundle. The feature last above described is of importance in the last invention in that in similar devices heretofore employing a hook or its equivalent the jaw carrying the hook has been extended beyond the hook which necessarily requires the formation of a relatively large loop at the point of tying and as the slack is taken up from this loop it is transmitted to the portion of the twine passing around the grain and in some instances the expansion of the grain is not sufficient to take up this additional slack in the binding twine and the bundle 4 falls apart as it is deposited on the ground.

Having described my invention what I claim as new and desire to secure by Letters-Patent is:—

1. A knotter comprising a spindle, a jaw fixed thereto and having a channel and a perforation entering the channel and located in the vicinity of the end of the jaw, a jaw pivoted to the first said jaw and adapted to enter said channel, the twine engaging end of the pivoted jaw being shorter than the twine engaging end of the fixed jaw, said pivoted jaw having at the extremity of its end a hook adapted to enter said perforation.

2. A knotter comprising a spindle, a jaw fixed thereto and having a channel and a perforation entering the channel and located in the vicinity of the end of the jaw, a jaw pivoted to the first said jaw and adapted to enter said channel, the twine engaging end of the pivoted jaw being shorter than the twine engaging end of the fixed jaw, said pivoted jaw having at the extremity of its end a hook adapted to enter said perforation, said pivoted jaw when closed having contact with the bottom of the channel at one point only which point is located between said hook and the pivot of said pivoted jaw.

In testimony that I claim the foregoing as my own, I have hereto affixed my signature in the presence of two witnesses.

RICHARD H. MOORE.

Witnesses:
W. CLINESMITH,
C. J. R. McFALL.